(12) United States Patent
Daly

(10) Patent No.: US 10,774,633 B2
(45) Date of Patent: Sep. 15, 2020

(54) PRESSURE SEALED DETECTOR HOUSING WITH ELECTRICAL CONNECTION PASS THROUGH

(71) Applicant: Halliburton Energy Services, Inc., Houston, TX (US)

(72) Inventor: Stephen Robert Daly, Gloucester (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/318,327

(22) PCT Filed: Aug. 24, 2016

(86) PCT No.: PCT/US2016/048452
§ 371 (c)(1),
(2) Date: Jan. 16, 2019

(87) PCT Pub. No.: WO2018/038725
PCT Pub. Date: Mar. 1, 2018

(65) Prior Publication Data
US 2019/0284925 A1    Sep. 19, 2019

(51) Int. Cl.
*E21B 47/01*   (2012.01)
*G01V 5/12*    (2006.01)
*E21B 47/017*  (2012.01)

(52) U.S. Cl.
CPC ........... *E21B 47/01* (2013.01); *E21B 47/017* (2020.05); *G01V 5/12* (2013.01)

(58) Field of Classification Search
CPC .............................. E21B 47/01; E21B 47/011
See application file for complete search history.

(56) References Cited

U.S. PATENT DOCUMENTS

| 5,047,635 A | * | 9/1991 | Leaney ................. E21B 47/011 |
| | | | 250/256 |
| 6,705,406 B2 | * | 3/2004 | Das ........................ E21B 47/01 |
| | | | 166/381 |
| 2010/0132434 A1 | | 6/2010 | Moake |

(Continued)

FOREIGN PATENT DOCUMENTS

WO    2014168960 A2    10/2014

OTHER PUBLICATIONS

PCT Application Serial No. PCT/US2016/048452, International Search Report, dated May 16, 2017, 3 pages.

(Continued)

*Primary Examiner* — Giovanna Wright
(74) *Attorney, Agent, or Firm* — Gilliam IP PLLC

(57) ABSTRACT

Described herein are a pressure-sealed detector housing for securing a detector, such as a gamma ray detector in a tool for use in a wellbore. A detector housing is described which includes a body portion with an internal cavity to receive the detector, and having flanges extending therefrom. The flanges can extend, in some cases, generally alongside at least a portion of the internal cavity. Flanges may have one or more mounting holes for mounting the housing to a tool. An opening will be provided in the detector housing to provide access to the internal cavity to facilitate placement of the detector therein. A closure device is coupled into the opening to substantially seal the opening and provide electrical connections to the detector.

20 Claims, 8 Drawing Sheets

(56) References Cited

U.S. PATENT DOCUMENTS

| | | |
|---|---|---|
| 2010/0186944 A1 | 7/2010 | Hall et al. |
| 2012/0096935 A1 | 4/2012 | Finke et al. |
| 2014/0150547 A1 | 6/2014 | Chau et al. |
| 2018/0010440 A1* | 1/2018 | Maeland ............. E21B 47/0001 |

OTHER PUBLICATIONS

PCT Application Serial No. PCT/US2016/048452, International Written Opinion, dated May 16, 2017, 9 pages.

\* cited by examiner

US 10,774,633 B2

PRESSURE SEALED DETECTOR HOUSING WITH ELECTRICAL CONNECTION PASS THROUGH

BACKGROUND

Methods and tools have been developed to search and exploit potential reservoirs of hydrocarbons in subterranean environments (e.g., subsurface and/or subsea). In some cases, measurements of formation porosity and density are used to identify potential oil and gas reserves as well as to estimate the volume of the reserve.

Nuclear logging tools are sometimes used to measure the interactions between radiation emitted from such a tool and the formation, as well as naturally occurring radiation. Tools including gamma ray detectors are sometimes employed to measure formation porosity and lithology.

A gamma ray detector mounted in a housing is typically inserted through an opening in a tool housing and mounted internal to the tool housing. A separate cover is attached to the housing to cover the opening and protect the detector in the separate housing. The additional material of the cover between the detector housing and the formation shades the detector from receipt of the formation gamma rays and may degrade its performance.

DETAILED DESCRIPTION

The challenge noted above, as well as others, can be addressed by the various examples of a pressure-sealed scintillator detector assembly mounted on the outer surface of a tool housing, as disclosed herein. By using a one piece pressure-sealed detector housing, with integral cover the housing may be mounted into a pocket in a sub or other downhole component to suspend the detector assembly within the component. The one piece pressure-sealed detector housing also reduces the amount of material between the scintillator and the formation to reduce shading of the scintillator.

Figure 1:
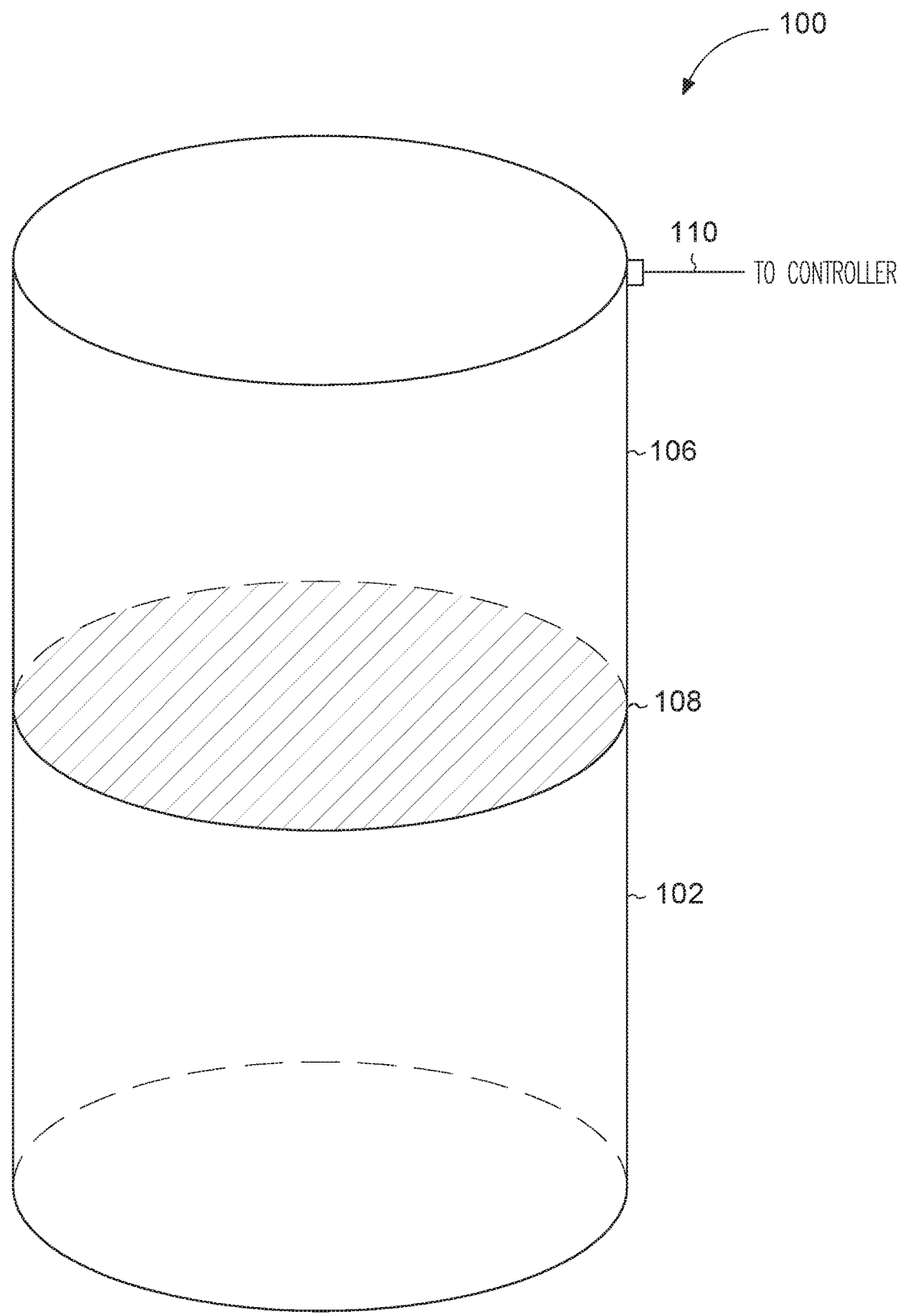
FIG. 1 illustrates a cross-sectional diagram of a gamma ray detector assembly, in accordance with various embodiments.

FIG. 1 illustrates a typical prior art cross-sectional diagram of a gamma ray detector assembly 100, in accordance with various embodiments. The detector assembly 100 is shown only for purposes of illustration of a typical nuclear logging tool (e.g., detector, scintillator, gamma ray detector) since the embodiments disclosed herein may be used with other downhole tools. The gamma ray detector assembly 100 may be employed to determine one or more properties (e.g., porosity, density, and lithology) of a geological formation.

The gamma ray detector assembly 100 includes an annular sleeve scintillation device 102 and a light sensor 106 separated from the scintillation device 102 at a border 108. The scintillation device 102 may be fabricated from a Li-6 scintillating material that emits photons in response to gamma rays incident on the device.

The light sensor 106 is coupled to the scintillation device 102. The light sensor 106 may be a photomultiplier tube (PMT) or a photodiode. The light sensor 106 is configured to receive and convert photons emitted by the scintillation device 102 into an electrical signal coupled to a controller over a conductor 110. The electrical signal may include an indication of the detected gamma ray energy to be used by the controller.

In response to incident gamma rays, the scintillating material of scintillation device 102 exhibits the property of luminescence. Thus the scintillation device 102, when struck by incoming gamma rays, absorbs the energy of the gamma rays and re-emits the absorbed energy in the form of light. The light sensor 106 is configured to detect the light emitted by the scintillation device 102 and generate the electrical signal representative of the detected energy.

Figure 2:
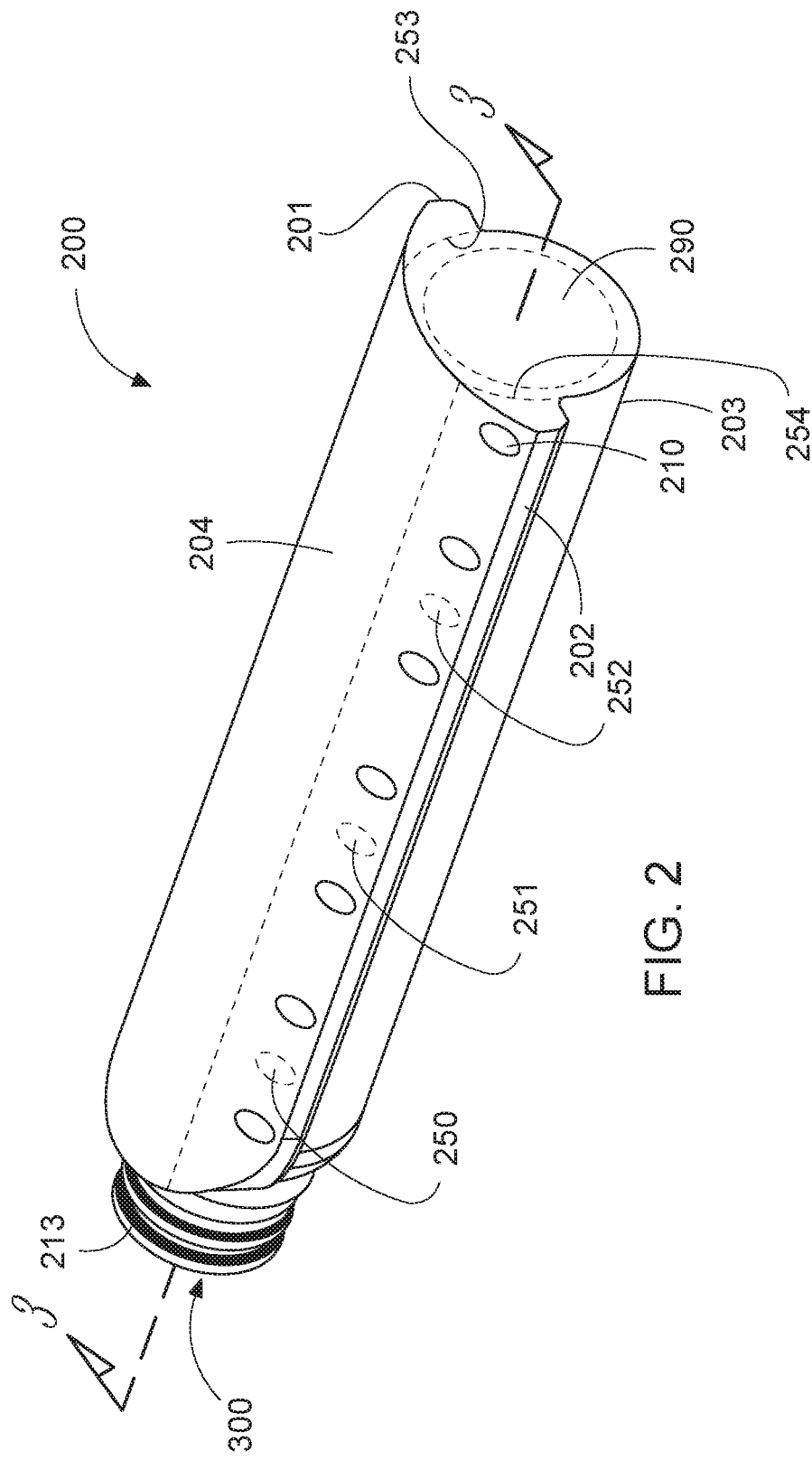
FIG. 2 shows a diagram of a pressure-sealed detector housing, in accordance with various embodiments.

FIG. 2 shows a diagram of a pressure-sealed detector housing 200, in accordance with various embodiments. The pressure-sealed detector housing 200 may be used to seal a detector such as the detector assembly 100 of FIG. 1. Other embodiments may seal other tools within the housing 200.

The pressure-sealed detector housing 200 includes a main body portion 203 that is integral with an external surface portion 204. The main body portion 203 and the external surface portion 204 may be constructed as one integrated unit or the main body portion 203 may be welded or connected in some other way to be integral with the external surface portion 204. As used herein, the term "integral," as used to describe the relationship of the main body portion 203 and the external surface portion 204 and/or the relationship of the main body portion and the flanges, means that the identified components are one effectively inseparable unit, whether they were formed of a single material block, or by joining the components by an effectively permanent coupling method (for example, by welding).

The main body portion 203 comprises an interior cavity 290 such that it is substantially hollow with an opening 300 (see FIG. 3) on at least one end. The opening 300 enables insertion of the detector assembly 100. The opening 300 may then be sealed.

The pressure-sealed detector housing 200 further includes flanges 201, 202 that, in this example are integral with the external surface portion 204 and main body portion 203. The flanges 201, 202 extend relative to the main body portion 203 and are configured for mounting the pressure-sealed detector housing 200 within a logging tool. As can be seen from the depicted example, flanges 201, 202 extend generally alongside the internal cavity, and in this example also extend generally parallel to the internal cavity. In other embodiments, the flanges may extend either parallel or at least alongside at least only a portion of the internal cavity.

In other embodiments the flanges may be detachably coupled 253, 254 to the detector housing (such as by bolts or other insertable fasteners 250-252). To accomplish the mounting of the pressure-sealed detector housing 200, the flanges 201, 202 each include a plurality of mounting holes 210 that are each configured to accept a fastener (e.g., bolt, screw). In the illustrated embodiment, the flanges 201, 202 each share the same number of mounting holes 210. The mounting holes 210 in the housing 200 are through-holes that are not threaded such that the fastener may be inserted through the hole to mate with corresponding threaded holes in the tool. The depicted example uses two flanges, each extending alongside an interior cavity with in the detector housing, in one anticipated embodiment.

In this example, the external surface portion 204 and integral flanges 201, 202 are curved to form an arcuate outer surface that has a radius that provides a relatively flush surface relative with the tool into which the pressure-sealed detector housing 200 will be mounted. One embodiment of a tool that includes the attached pressure-sealed detector housing 200 is illustrated and explained in greater detail later herein. The arc of the outer surface may be formed such that, once the pressure-sealed detector housing 200 is mounted into the tool, the combination of the tool and the detector housing 200 exhibits a relatively circular cross-section.

The pressure-sealed detector housing 200 further includes a closure device 213 at one end of the housing 200 that is insertable into and seals the open end of the main body portion 203. The detector mounting assembly includes one or more electrical conductors that extend between the interior cavity and the exterior of the detector housing 200. In the depicted example, the electrical conductors are contained within the closure device 213; and thus the closure device 213 provides mechanical connection between the pressure-sealed detector-housing 200 and the detector assembly 100 therein; and also provides electrical connection between a detector within the detector housing 200 and the tool into which the detector housing 200 is mounted. In this example the closure device includes multiple conductors within an electrical connector assembly configured to engage a complementary electrical connector assembly within the logging tool in which the detector assembly 100 is mounted.

The closure device 213 provides a water- and air-tight seal for the pressure-sealed detector housing 200. Thus, the housing 200 may be pressurized during the manufacture of the housing 200 and detector assembly 100 apparatus combination and the closure device 213 provides a seal to hold this pressure in the pressure-sealed detector housing 200.

Figure 3:
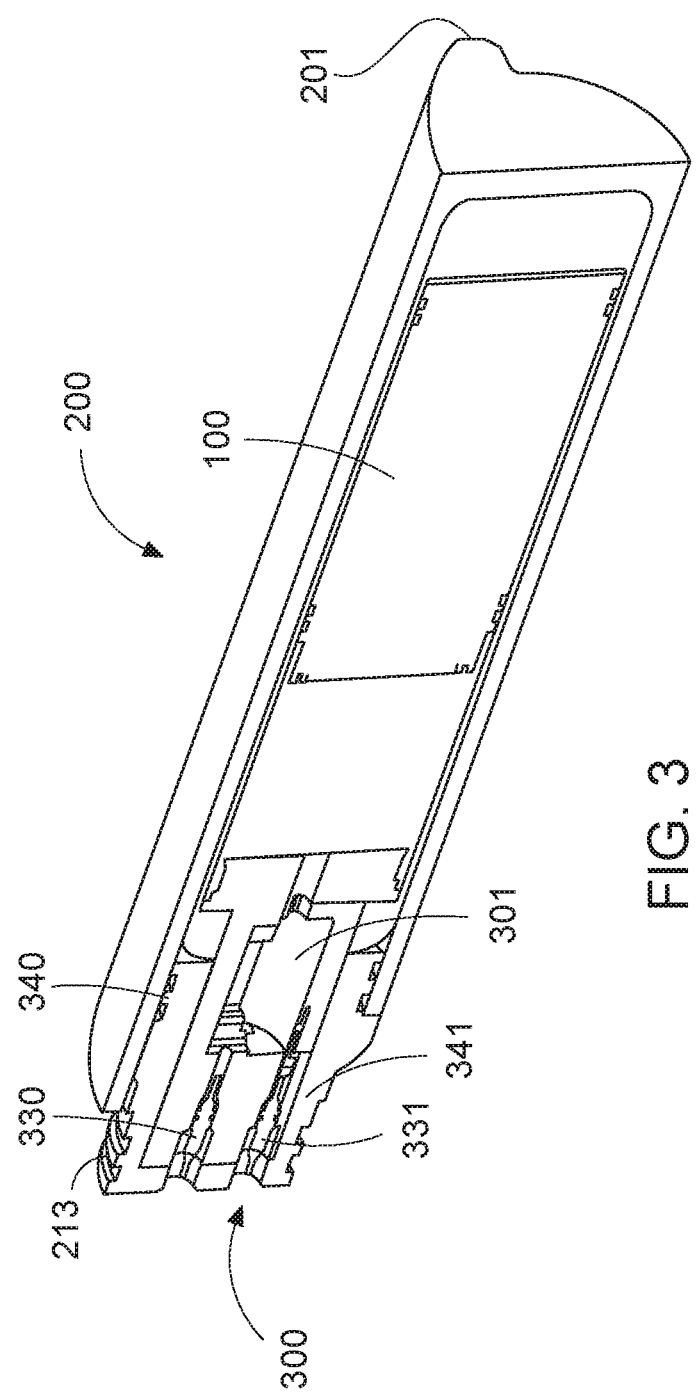
FIG. 3 shows a cross-sectional diagram of the pressure-sealed detector housing, in accordance with various embodiments.

FIG. 3 shows a cross-sectional diagram of the pressure-sealed detector housing 200, in accordance with various embodiments. The cross-sectional view is along line 3-3 of FIG. 2. This view shows the hollow interior of the housing 200 with the already inserted detector assembly 100. The housing 200 comprises a one-piece construction with an opening 300 on one end in order to accept the detector assembly 100 for insertion through the opening 300 into the main body portion cavity.

The cross-sectional view also illustrates the electrical interface 301 between the detector assembly 100 and the closure device 213. The closure device 213 provides a plurality of female-type electrical contact openings 330, 331 that are configured to accept a male-type plug in the tool. The closure device 213 may include a first portion 340 having a threaded exterior that screws into the interior of a threaded interior portion of the housing 200. The threaded portion is only for purposes of illustration as other ways to insert and hold the closure device 213 within the housing 200, while providing an air- and water-tight seal, may also be used.

A second portion 341 of the closure device 213 is external to the housing 200 when the housing and detector apparatus is complete. The second portion 341 may be threaded or have mating ridges that mate with a tool closure device in the tool to provide mechanical engagement to capture and hold the housing and detector assembly 100 in the tool.

Figure 4:
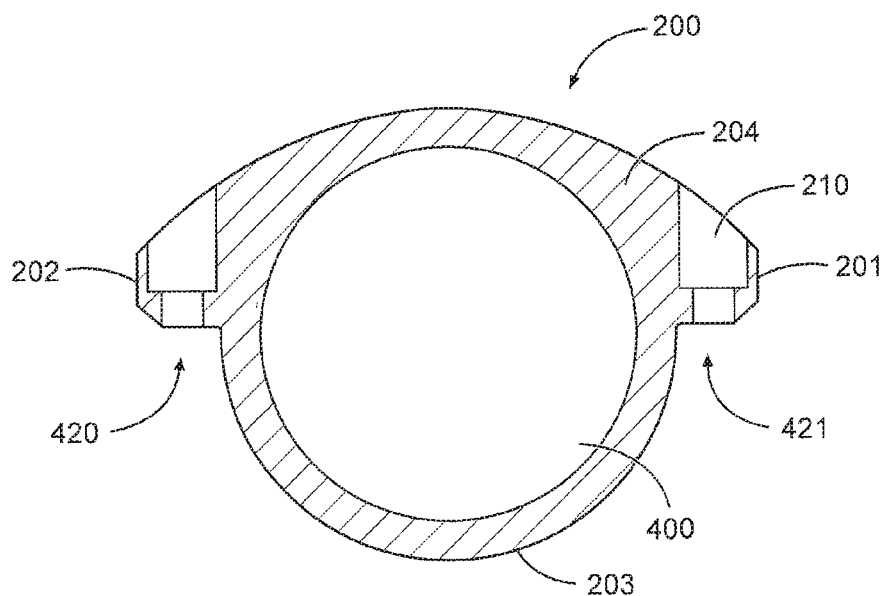
FIG. 4 shows an end cross-sectional diagram of the pressure-sealed detector housing, in accordance with various embodiments.

FIG. 4 shows an end cross-sectional diagram of the pressure-sealed detector housing, in accordance with various embodiments. This figure shows the integral nature of the external surface portion 204, the main body portion 203 and the flanges 201, 202. This view also shows relatively flat lower mating surfaces 420, 421 that contact and seal against substantially similar surfaces in the tool. The mounting holes 210 are through-holes in the flanges 201, 202 that enable a fastener (e.g., screw, bolt) to extend through its respective mounting hole 210 and into the tool.

The interior cavity 400 provides the location into which the detector assembly 100 may be located. While the interior cavity 400 is shown as being substantially circular to accept a substantially circular detector assembly 200, other embodiments are not restricted to such a shape for either the interior cavity 400 or the detector assembly 200. Similarly, the lower exterior surface of the main body portion is shown as substantially circular to be accepted into a substantially circular pocket. Other embodiments are not restricted to such a shape.

Figure 5:
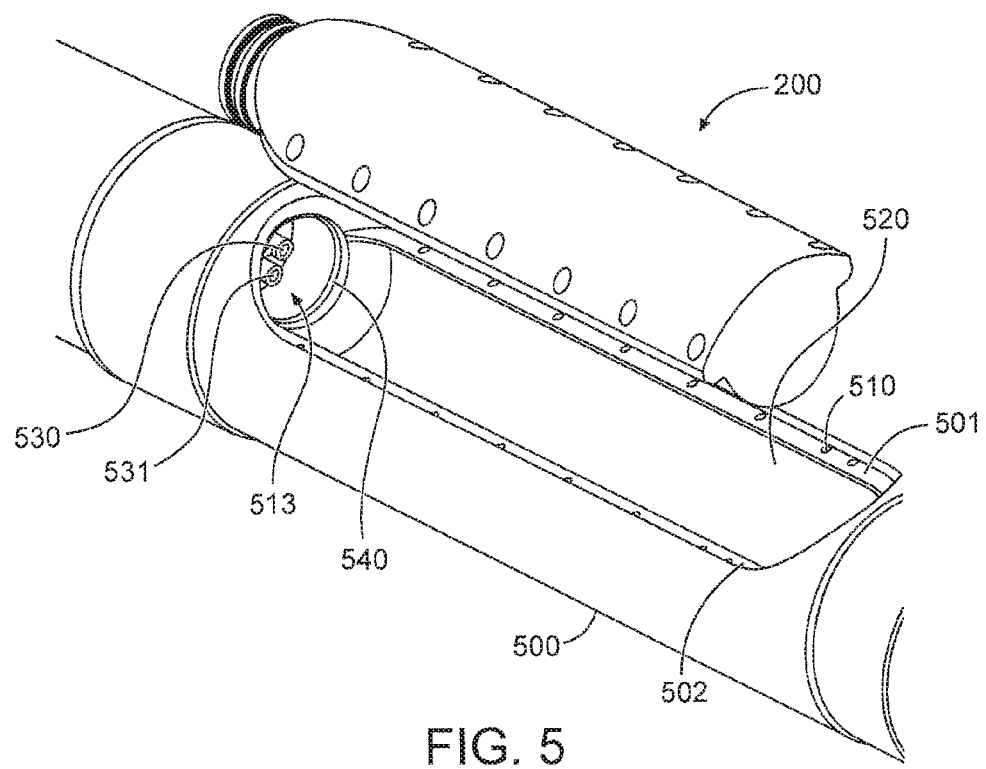
FIG. 5 shows an exploded diagram of the pressure-sealed detector housing to be mounted in a component pocket, in accordance with various embodiments.

FIG. 5 shows an exploded diagram of the pressure-sealed detector housing 200 to be mounted in a component pocket 520, in accordance with various embodiments. For purposes of illustration, the drillstring component 500, in the illustrated embodiment, is a sub.

In many examples, the component pocket 520 is configured to closely engage the inner surfaces of the detector housing 200. In the depicted example this close engagement is achieved by the pocket defining a recess that is substantially complementary to both the shape and size as the detector housing 200. Thus, when the detector housing 200 is installed in the pocket 520, generally flush engagement is achieved on mating surfaces 501, 502 on at least two sides of the pocket 520.

The mating surfaces 501, 502 include a plurality of fastener holes 510 that each correspond to a respective one of the mounting holes 210 in the flanges 201, 201. Thus, a fastener inserted through a mounting hole 210 in the flanges 201, 202 will also be inserted into the corresponding hole in the mating surfaces 501, 502. The inside surface of each fastener hole 510 is threaded to accept a similarly threaded closure device.

One end of the component pocket 520 includes a connector area 513 that includes electrical connectors 530, 531 configured to mate with the contact openings 330, 331 of the pressure-sealed detector housing 200. While the electrical connectors 530, 531 of the connector area 513 are shown as being male-type connectors to mate with female-type connectors on the pressure-sealed detector housing 200, this convention may be reversed in another embodiment.

The connector area 513 may also include a mechanical retention device 540 that mates with the closure device 213 of the pressure-sealed detector housing 200. This retention device 540 may be one or more ridges.

Figure 6:
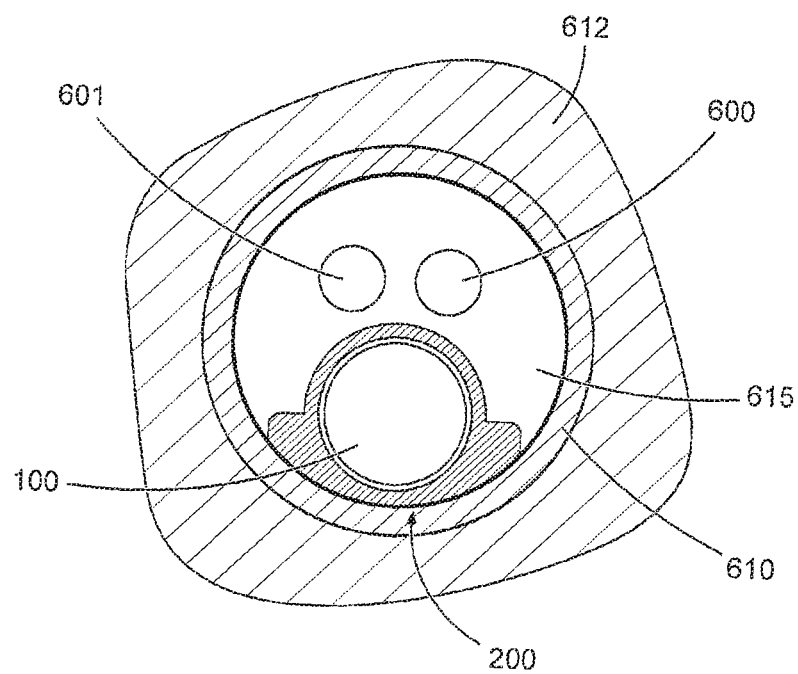
FIG. 6 shows an end cross-sectional diagram of the pressure-sealed detector housing mounted in the component pocket, in accordance with various embodiments.

FIG. 6 shows an end cross-sectional diagram of the pressure-sealed detector housing 200 mounted in the component pocket, in accordance with various embodiments. This cross-sectional diagram shows the housing 200 and the drillstring component 615 (e.g., sub) as it would appear in a borehole in a geological formation 612. A fluid (e.g., drilling mud) 610 is shown separating the component 615 from the borehole wall.

The component 615 comprises one or more passages 600, 601 extending longitudinally through the component 615. These passages 600, 601 enable a fluid (e.g., mud) to be circulated through the drillstring component. The fluid may be used for cooling, lubrication of the drill bit, or other uses.

The detector assembly 100 in the component pocket is offset from a centerline of the tool 615. This orientation reduces the distance between the detector assembly 100 and borehole wall of the formation 612.

The component of FIG. 6 is referred to as a drill string component only for purposes of illustration. The pressure-sealed detector housing 200 may also be incorporated into a wireline component such as a sonde.

Figure 7:
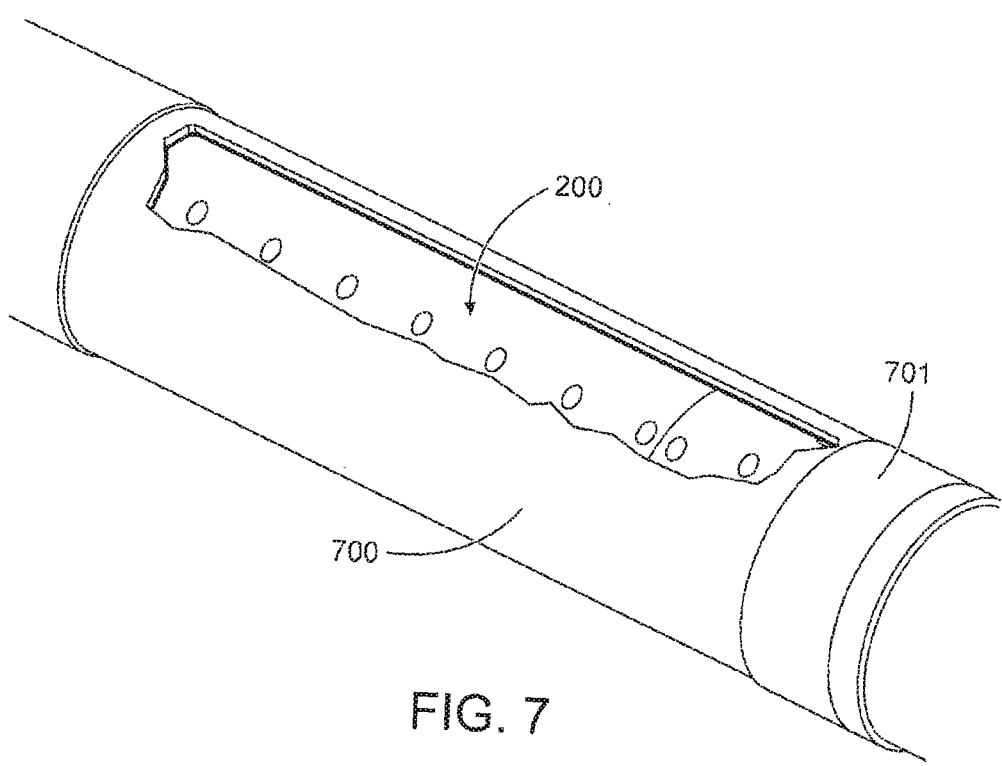
FIG. 7 shows a cut-away diagram of the pressure-sealed detector housing mounted in the component pocket with a protective sleeve over the component, in accordance with various embodiments.

FIG. 7 shows a cut-away diagram of the pressure-sealed detector housing 200 mounted in the component pocket with a protective sleeve 700 over the component, in accordance with various embodiments. A locking nut 701 may be coupled to the protective sleeve 700 in order to hold the sleeve 700 to the component. The inside surface of the locking nut 701 may be threaded to mate with a threaded surface on the outside surface of the component.

The sleeve 700 comprises a slightly larger inside diameter relative to the outside diameter of the component. Thus, the sleeve 700 is allowed to slide freely over the surface of the component while still contacting the outside surface of the component. Once the sleeve 700 is in position, the locking nut 701 may be tightened to stop movement of the sleeve 700.

The sleeve 700 is not necessary for use of the pressure-sealed detector housing 200. The sleeve 700 may provide extra protection of the exposed surface of the pressure-sealed detector housing 200 depending on the downhole environment that is expected.

Figure 8:
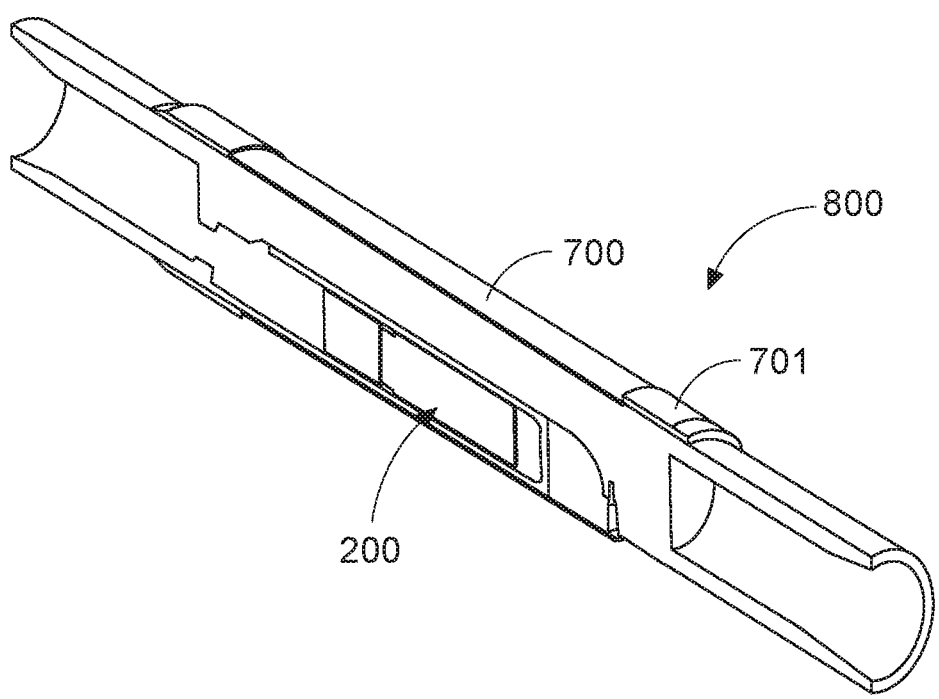
FIG. 8 shows a cross-sectional diagram of a sub with the mounted pressure-sealed detector housing, in accordance with various embodiments.

FIG. 8 shows a cross-sectional diagram of a sub 800 with the mounted pressure-sealed detector housing 200, in accordance with various embodiments. The optional sleeve 700 and locking nut 701 of FIG. 7 are also shown in the installed configuration. The sub 800 is shown as part of other components of a drillstring.

Figure 9:
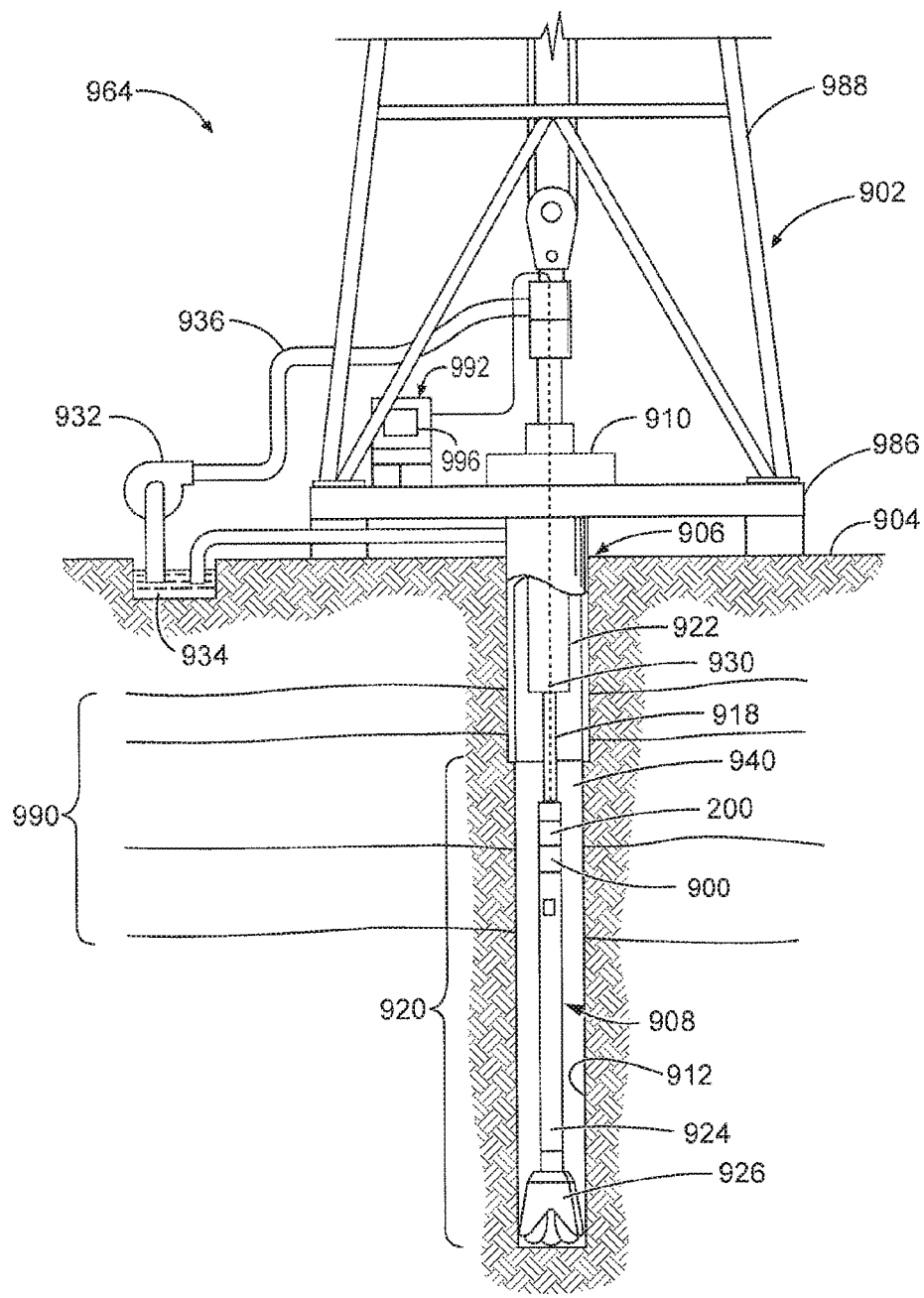
FIG. 9 shows a diagram of an example of a drilling system, in accordance with various embodiments.

FIG. 9 is a diagram showing a drilling system, according to various embodiments. The system 964 includes a drilling rig 902 located at the surface 904 of a well 906. The drilling rig 902 may provide support for a drillstring 908. The drillstring 908 may operate to penetrate the rotary table 910 for drilling the borehole 912 through the subsurface formations 990. The drillstring 908 may include a drill pipe 918 and the bottom hole assembly (BHA) 920 (e.g., drill string), perhaps located at the lower portion of the drill pipe 918.

The BHA 920 may include drill collars 922, a downhole tool 924, stabilizers sensors, an RSS, a drill bit 926, as well as other possible components. The drill bit 926 may operate to create the borehole 912 by penetrating the surface 904 and the subsurface formations 990. The BHA 920 may further include a downhole tool including the resistivity imaging tool 900 as described previously in FIG. 1. The resistivity imaging tool 900 in combination with subsequently described controllers may form a resistivity imaging tool system. Downhole measurement and sampling tools used as a portion of a drill string (or similar tubulars) are referred to in the industry as "measurement while drilling" (MWD) or "logging-while drilling" (LWD) tool. For purposes of the present disclosure, all such tools are referred to herein as MWD tools.

During drilling operations within the borehole 912, the drillstring 908 (perhaps including the drill pipe 918 and the BHA 920) may be rotated by the rotary table 910. Although not shown, in addition to or alternatively, the BHA 920 may also be rotated by a motor (e.g., a mud motor) that is located downhole. The drill collars 922 may be used to add weight to the drill bit 926. The drill collars 922 may also operate to stiffen the BHA 920, allowing the BHA 920 to transfer the added weight to the drill bit 926, and in turn, to assist the drill bit 926 in penetrating the surface 904 and subsurface formations 990.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some examples, the drilling fluid can be used to cool the drill bit 926, as well as to provide lubrication for the drill bit 926 during drilling operations. Additionally, the drilling fluid may be used to remove subsurface formation cuttings created by operating the drill bit 926.

A workstation 992 including a controller 996 may include modules comprising hardware circuitry a processor, and/or memory circuits that may store software program modules and objects, and/or firmware, and combinations thereof that are configured to execute at least the methods of FIGS. 4-6. The workstation 992 may also include modulators and demodulators for modulating and demodulating data transmitted downhole through the cable 930 or telemetry received through the cable 930 from the downhole environment. The workstation 992 and controller 996 are shown near the rig 902 only for purposes of illustration, as these components may be located at remote locations. The workstation 992 may include the surface portion of the resistivity imaging tool system.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Figure 10:
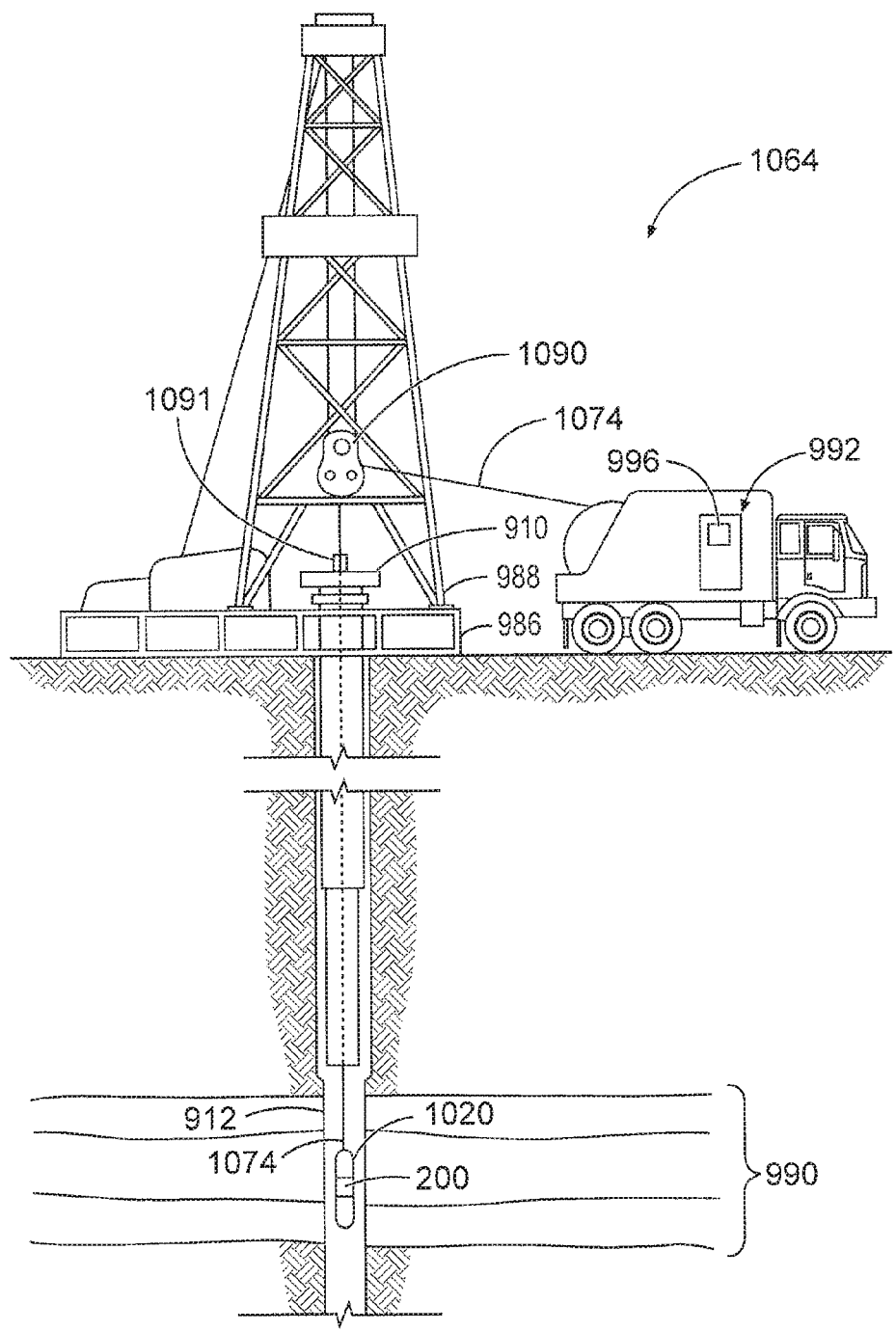
FIG. 10 shows a diagram of a wireline system, in accordance with various embodiments.

FIG. 10 is a diagram showing a wireline system 1064, according to various examples of the disclosure. The system 1064 may comprise at least one wireline logging tool body 1020, as part of a wireline logging operation in a borehole 912, including the pressure-sealed detector housing 200 described previously.

A drilling platform 986 equipped with a derrick 988 that supports a hoist 1090 can be seen. Drilling oil and gas wells is commonly carried out using a string of drill pipes connected together so as to form a drillstring that is lowered through a rotary table 910 into the borehole 912. Here it is assumed that the drillstring has been temporarily removed from the borehole 912 to allow the wireline logging tool body 1020, such as a probe or sonde with the pressure-sealed detector housing 200, to be lowered by wireline or logging cable 1074 (e.g., slickline cable) into the borehole 912. Typically, the wireline logging tool body 1020 is lowered to the bottom of the region of interest and subsequently pulled upward at a substantially constant speed.

The following numbered examples are illustrative embodiments of the subject matter disclosed herein.

Example 1 is a mounting assembly for mounting a detector in a tool for use in a wellbore, comprising: a detector housing defining an interior cavity configured to receive the detector, the detector housing having an opening extending to the interior cavity; one or more flanges extending from the detector housing, and extending at least in part alongside the interior cavity; a closure device having a portion with a mechanical coupling to engage the detector housing to seal the opening; and at least one electrical conductor extending between the exterior of the detector housing and the interior cavity.

In Example 2, the subject matter of Example 1 optionally includes wherein the detector housing is an integral structure forming a pressure resistant housing.

In Example 3, the subject matter of any one or more of Examples 1-2 optionally include wherein the flanges are integral with the detector housing.

In Example 4, the subject matter of Examples 1-3 optionally includes wherein outer surfaces of the detector housing and flanges are curved to form an arcuate exterior surface In Example 5, the subject matter of Examples 1-4 optionally includes wherein at least one flange is configured for mounting the assembly in the tool by a plurality of mounting holes in the flange that are configured to accept a fastener.

In Example 6, the subject matter of any one or more of Examples 1-5 optionally include wherein the detector housing is shaped for mounting the assembly in the tool by a sliding fit into a recess in the tool.

In Example 7, the subject matter of any one or more of Examples 1-6 optionally include wherein the electrical conductor comprises an electrical connector in the closure device.

In Example 8, the subject matter of any one or more of Examples 1-7 optionally include wherein the mechanical coupling of the closure device comprises a first threaded surface and wherein the detector housing includes a complimentary second threaded surface facilitating a threaded coupling of the closure device to the detector housing.

In Example 9, the subject matter of Example 7 optionally includes wherein the closure device further comprises an engagement portion configured to provide mechanical engagement with a portion of the tool.

Example 10 is a detector assembly for mounting in a tool for use in a well, comprising: a detector housing having an integral external surface portion, the detector housing having an opening on one end, the opening extending to an interior cavity of the body, the detector housing including flanges that extend generally in parallel with at least a portion of the interior cavity; a detector disposed within the interior cavity, the detector comprising electrical contacts; and a closure device coupled to the detector housing to seal the opening, the closure device comprising one or more electrical connectors coupled to the detector electrical contacts.

In Example 11, the subject matter of Example 10 optionally includes wherein the detector is a gamma ray detector.

In Example 12, the subject matter of any one or more of Examples 9-11 optionally include wherein the flanges each comprise: a relatively flat inner surface to engage flat surfaces on the well tool; and a plurality of mounting holes.

In Example 13, the subject matter of any one or more of Examples 9-12 optionally include wherein the detector has a substantially cylindrical shape, and therein the interior cavity has a substantially cylindrical shape along at least a portion of its length to receive the detector.

In Example 14, the subject matter of any one or more of Examples 9-13 optionally include wherein a relatively inner portion of the detector housing has a rounded profile to engage a rounded pocket in the well tool.

In Example 15, the subject matter of any one or more of Examples 9-14 optionally include wherein the closure device is configured to mechanically engage the detector housing proximate the opening to establish a pressure seal isolating the interior cavity from the environment external to the detector housing.

Example 16 is a system comprising: a downhole tool having a pocket with engagement surfaces on at least two sides of the pocket, at least one engagement surface having a plurality of fastener holes; and a detector assembly coupled within the pocket, the detector assembly comprising: a detector housing defining an interior cavity and having an opening extending to the interior cavity, the detector housing further including one or more flanges extending radially outwardly from the detector housing; a detector within the interior cavity; a closure device having a portion providing a mechanical coupling to engage the detector housing to seal the opening to external fluids and pressure; and at least one electrical conductor extending between the exterior of the detector housing and the detector within interior cavity.

In Example 17, the subject matter of Example 16 optionally includes wherein an external portion of the detector housing including the flanges forms an arcuate surface having a radius approximately matching that of the outer surface of the downhole tool, such that the external portion of the detector housing is substantially flush with the outer surface of the tool.

In Example 18, the subject matter of any one or more of Examples 15-17 optionally include wherein at least one of the flanges includes through holes, and wherein the detector assembly is mounted within the downhole tool with threaded fasteners extending through the through holes of the at least one flange and engaging the fastener holes in the downhole tool.

In Example 19, the subject matter of any one or more of Examples 15-18 optionally include wherein electrical conductor includes at least one electrical connector formed in the closure device and providing electrical connection between the detector and the downhole tool.

In Example 20, the subject matter of any one or more of Examples 15-19 optionally include wherein the downhole tool is one of a MWD tool or a wireline tool.

In Example 21, the subject matter of any one or more of Examples 15-20 optionally include wherein the downhole tool pocket is configured to closely engage the inner surfaces of the detector assembly.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A mounting assembly comprising:
a detector housing defining an interior cavity to receive a detector, the detector housing having an opening extending into the interior cavity, one or more flanges extending from the detector housing, wherein an external surface portion of the housing and the one or more flanges are curved to form an arcuate exterior surface; and
a closure device configured to seal the opening, and comprising at least one electrical connection extending between the exterior of the closure device and the interior cavity.

2. The mounting assembly of claim 1, wherein the detector housing is an integral structure.

3. The mounting assembly of claim 1, wherein the one or more flanges are integral with the detector housing.

4. The mounting assembly of claim 1, wherein at least one flange is configured for mounting the assembly in the tool by a plurality of mounting holes in the flange that are configured to accept a fastener.

5. The mounting assembly of claim 1, wherein the detector housing is shaped for mounting the assembly in the tool by a sliding fit into a recess in the tool.

6. The mounting assembly of claim 1,
wherein the closure device comprises a first threaded surface, wherein the detector housing includes a complementary second threaded surface and wherein the closure device seals the opening via a threaded coupling of the closure device to the detector housing.

7. The mounting assembly of claim 1,
wherein the closure device comprises a first ridged surface, wherein the detector housing includes a complementary second surface and wherein the closure device seals the opening via a mechanical coupling of the closure device to the detector housing.

8. The mounting assembly of claim 1, wherein the detector housing forms a pressure resistant housing when sealed with the closure device.

9. A detector assembly comprising:
a wellbore tool having an exterior surface;
a detector housing having an integral external surface portion that includes flanges, an opening on one end, wherein the opening extends into an interior cavity of a body of the detector housing, the integral external surface portion is curved to form an arcuate exterior surface and that forms a portion of the external surface of the wellbore tool; and
a closure device coupled to the detector housing to seal the opening, wherein the closure device comprises one or more electrical connections between the interior cavity and the wellbore tool.

10. The detector assembly of claim 9, wherein each of the one or more flanges comprises:
a relatively flat inner surface, wherein the relatively flat inner surface engages with flat surfaces on the wellbore tool; and
a plurality of mounting holes.

11. The detector assembly of claim 9, wherein a relatively inner portion of the detector housing has a profile complementary to a pocket in the well tool.

12. The detector assembly of claim 9, wherein the closure device engages the detector housing proximate to the opening to pressure seal the interior cavity from the environment external to the detector housing.

13. A system comprising:
a downhole tool having a pocket with engagement surfaces on at least two sides of the pocket, wherein at least one engagement surface has a plurality of fastener holes; and
a detector assembly coupled within the pocket, the detector assembly comprising:
a detector housing defining an interior cavity, an opening extending into the interior cavity, and one or more flanges;
a detector within the interior cavity; and
a closure device configured to seal the opening to external fluids and pressure and comprising at least one electrical connection extending between the exterior of the closure device and the detector.

14. The system of claim 13, wherein the detector housing is coupled in the pocket of the downhole tool and wherein an external portion of the detector housing includes at least one of the one or more flanges and the external portion of the detector housing forms an arcuate surface having a radius approximately matching that of an outer surface of the downhole tool to an extent that the detector housing coupled in the pocket of the downhole tool exhibits a relatively circular cross-section.

15. The system of claim 13, wherein at least one of the flanges includes through holes, and wherein the detector assembly mounts within the downhole tool with threaded fasteners, wherein the threaded fasteners extending through the through holes of the at least one flange and engage in fastener holes in the downhole tool.

16. The system of claim 13, wherein the at least one electrical connection includes at least one electrical connection electrically coupling the detector and the downhole tool.

17. The system of claim 13, wherein the downhole tool i-s-comprises at least one of a MWD tool, LWD tool, or a wireline tool.

18. The system of claim 13, wherein the pocket in the downhole tool engages at least one inner surface of the detector assembly.

19. The system of claim 13, wherein the detector is a gamma ray detector.

20. The system of claim 13, wherein the detector comprises a substantially cylindrical shape, and wherein the interior cavity is defined to receive the detector.

* * * * *

UNITED STATES PATENT AND TRADEMARK OFFICE
CERTIFICATE OF CORRECTION

PATENT NO. : 10,774,633 B2  
APPLICATION NO. : 16/318327  
DATED : September 15, 2020  
INVENTOR(S) : Stephen Robert Daly Page 1 of 1

It is certified that error appears in the above-identified patent and that said Letters Patent is hereby corrected as shown below:

In the Claims

Column 10, Lines 12 and 13, the portion reading "the interior cavity from the environment external to the detector housing." should read --the interior cavity.--

Column 10, Line 48, the portion reading "i-s-comprises" should read --comprises--

Signed and Sealed this
Tenth Day of November, 2020

Andrei Iancu
*Director of the United States Patent and Trademark Office*